US012542378B2

(12) United States Patent
Ando

(10) Patent No.: US 12,542,378 B2
(45) Date of Patent: Feb. 3, 2026

(54) CONNECTOR

(71) Applicant: SUMITOMO WIRING SYSTEMS, LTD., Mie (JP)

(72) Inventor: Motohiro Ando, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 374 days.

(21) Appl. No.: 18/016,751

(22) PCT Filed: Jul. 15, 2021

(86) PCT No.: PCT/JP2021/026613

§ 371 (c)(1),
(2) Date: Jan. 18, 2023

(87) PCT Pub. No.: WO2022/024784

PCT Pub. Date: Feb. 3, 2022

(65) Prior Publication Data

US 2023/0291132 A1 Sep. 14, 2023

(30) Foreign Application Priority Data

Jul. 31, 2020 (JP) ................................ 2020-130316

(51) Int. Cl.
*H01R 4/34* (2006.01)
*H01R 13/405* (2006.01)

(52) U.S. Cl.
CPC ............. *H01R 4/34* (2013.01); *H01R 13/405* (2013.01); *H01R 2201/26* (2013.01)

(58) Field of Classification Search
CPC ........ H01R 4/34; H01R 4/302; H01R 13/405; H01R 13/436; H01R 13/42; H01R 2201/26

(Continued)

(56) References Cited

U.S. PATENT DOCUMENTS 7,591,660 B1 * 9/2009 Eichhorst ................. H01R 9/24 439/721
7,811,116 B2 * 10/2010 Sakakura ................. H01R 4/34 439/364

(Continued)

FOREIGN PATENT DOCUMENTS

GB 2131631 A 6/1984
JP S56-131680 U1 10/1981

OTHER PUBLICATIONS

International Search Report issued on Sep. 28, 2021 for WO 2022/024784 A1 (4 pages).

*Primary Examiner* — Gary F Paumen
(74) *Attorney, Agent, or Firm* — Venjuris, P.C.

(57) ABSTRACT

One aspect of the present disclosure provides a connector capable of improving assemblability. A connector according to one aspect of the present disclosure is provided with a connector housing (50) including a plurality of accommodating portions (60A, 60B), a plurality of connection terminals (40A, 40B) held in the connector housing (50), and a plurality of nuts (80) respectively accommodated in the plurality of accommodating portions (60A, 60B). Each of the plurality of connection terminals (40A, 40B) includes a terminal connecting portion (42) to be connected to a mating terminal (100) by tightening a bolt (B1) into the nut (80). The plurality of terminal connecting portions (42) are provided apart from each other in an arrangement direction (Z) of the plurality of connection terminals (40A, 40B) and provided at positions not overlapping each other in a plan view from the arrangement direction (Z).

8 Claims, 10 Drawing Sheets

(58) Field of Classification Search
USPC .............................. 439/733.1, 364, 709, 801
See application file for complete search history.

(56) References Cited

U.S. PATENT DOCUMENTS

| | | | | |
|---|---|---|---|---|
| 9,228,605 | B2 * | 1/2016 | Takemura | H01R 4/301 |
| 2010/0009566 | A1 | 1/2010 | Sakakura et al. | |
| 2012/0223601 | A1 * | 9/2012 | Akuta | H02K 5/225<br>310/58 |
| 2015/0079855 | A1 | 3/2015 | Takemura et al. | |

* cited by examiner

CONNECTOR

CROSS REFERENCE TO RELATED APPLICATIONS

This application is a national phase of PCT application No. PCT/JP2021/026613, filed on Jul. 15, 2021, which claims priority from Japanese patent application No. 2020-130316, filed on Jul. 31, 2020, all of which are incorporated herein by reference.

TECHNICAL FIELD

The present disclosure relates to a connector.

BACKGROUND

Conventionally, a connector is known which is mounted into a case of an electrical device to be installed in a vehicle (see, for example, Patent Document 1). The connector of this type includes a plurality of terminal fittings each having a bolt insertion hole in a tip and to be connected to a mating terminal provided in the electrical device by bolting. Connected parts of the plurality of these terminal fittings to the mating terminals are aligned in a length direction of the terminal fittings and arranged laterally side by side.

PRIOR ART DOCUMENT

Patent Document

Patent Document 1: JP 2015-060680 A

SUMMARY OF INVENTION

Problem to be Solved

The connector described above is desired to improve assemblability to the mating terminals and there has been a room for improvement in this point.

The present disclosure aims to provide a connector capable of improving assemblability.

Means to Solve the Problem

The present disclosure is directed to a connector with a connector housing including a plurality of accommodating portions, a plurality of connection terminals held in the connector housing, and a plurality of nuts respectively accommodated in the plurality of accommodating portions, each connection terminal including a terminal connecting portion to be connected to a mating terminal by tightening a bolt into the nut, and a plurality of the terminal connecting portions being provided apart from each other in an arrangement direction of the plurality of connection terminals and provided at positions not overlapping each other in a plan view from the arrangement direction.

Effect of the Invention

According to the connector of the present disclosure, an effect of being capable of improving assemblability is achieved.

DETAILED DESCRIPTION TO EXECUTE THE INVENTION

Description of Embodiments of Present Disclosure

Figure 1:
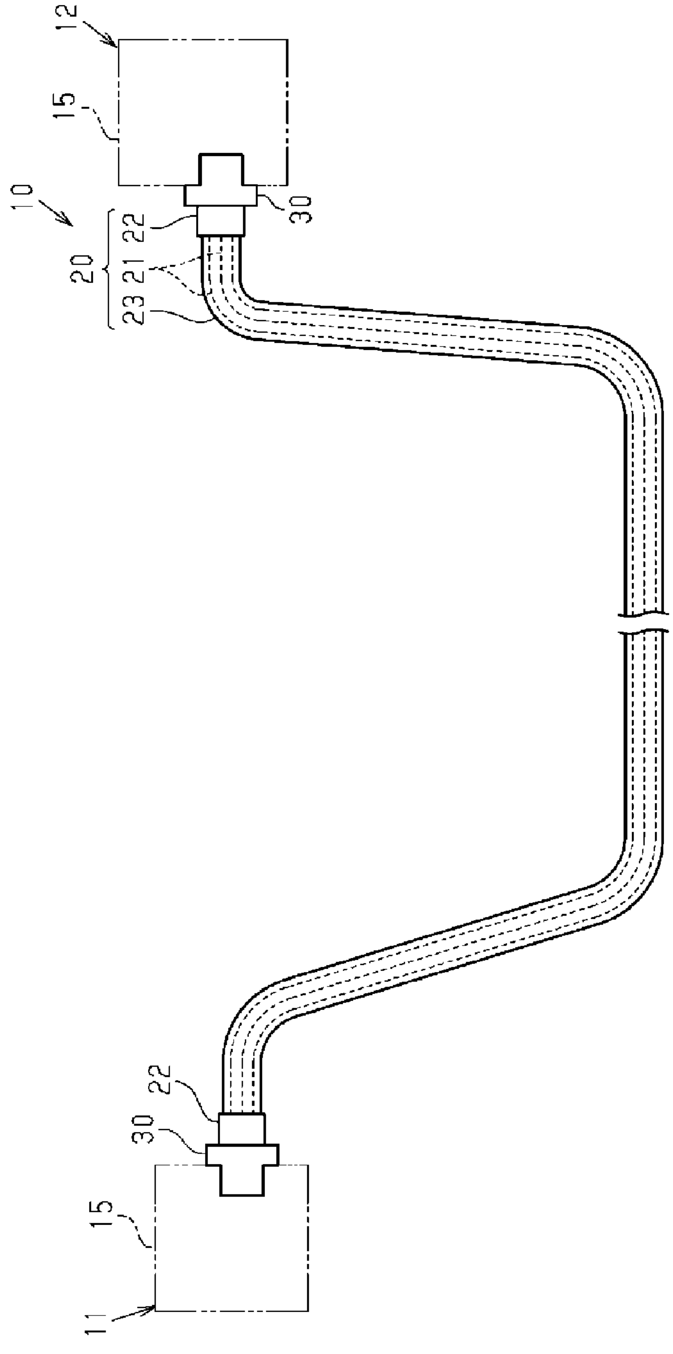
FIG. 1 is a schematic configuration diagram showing a wiring harness of one embodiment.

First, embodiments of the present disclosure are listed and described.

[1] The connector of the present disclosure is provided with a connector housing including a plurality of accommodating portions, a plurality of connection terminals held in the connector housing, and a plurality of nuts respectively accommodated in the plurality of accommodating portions, each of the plurality of connection terminals including a terminal connecting portion to be connected to a mating terminal by tightening a bolt into the nut, and a plurality of the terminal connecting portions being provided apart from each other in an arrangement direction of the plurality of connection terminals and provided at positions not overlapping each other in a plan view from the arrangement direction.

According to this configuration, the plurality of terminal connecting portions are provided apart from each other in the arrangement direction of the plurality of connection terminals and provided at the positions not overlapping each other in the plan view from the arrangement direction. Thus, the plurality of terminal connecting portions are not adjacently arranged in three directions including the arrangement direction and two directions orthogonal to the arrangement direction. Therefore, the mating terminal can be connected to the terminal connecting portion from two directions except a direction parallel to a tightening direction of the bolt, out of the three directions. In this way, assembling directions (connecting directions) of the mating terminal to the terminal connecting portion can be increased as compared to the case where the plurality of terminal connecting portions are provided at positions overlapping each other in the plan view from the arrangement direction, and a degree of freedom of the assembling directions can be improved. As a result, the assemblability of the mating terminal and the terminal connecting portion can be improved.

[2] Preferably, a nut cover is further provided which covers the nuts accommodated in the accommodating portions, the nuts are inserted and accommodated into the accommodating portions along an inserting direction, the nut cover is inserted and accommodated into the accommodating portions along the inserting direction, and the nut cover restricts movements of the nuts in a direction opposite to the inserting direction.

According to this configuration, the nuts are inserted into the accommodating portions along the inserting direction and the nut cover is inserted into the accommodating portions along the inserting direction. In this way, the inserting direction of the nuts into the accommodating portions and the inserting direction of the nut cover into the accommodating portions can be set in the same direction. Thus, assembling man-hours of the connector can be reduced as compared to the case where the inserting directions of the nuts and the nut cover are different.

[3] Preferably, the inserting direction is a direction intersecting a tightening direction of the bolt. According to this configuration, the nuts and the nut cover are inserted into the accommodating portions along the direction intersecting the tightening direction of the bolt. Thus, it is suppressed that the nut cover is provided at a position overlapping the nuts in a plan view from the tightening direction of the bolt. In this way, even if an excessive load is applied to the nut from the tightening direction of the bolt, for example, during a tightening operation of the bolt or the like, that load can be suppressed from being applied to the nut cover. Therefore, the damage of the nut cover due to the above excessive load can be suppressed.

[4] Preferably, the nut cover is a component separate from the connector housing, the nut is formed into a rectangular prism having an upper surface, a lower surface and four side surfaces provided between the upper and lower surfaces, the nut includes a through hole penetrating between the upper and lower surfaces, and three side surfaces, out of the four side surfaces, are supported by the connector housing constituting an inner surface of the accommodating portion and the remaining one side surface is supported by the nut cover.

According to this configuration, the three side surfaces, out of the four side surfaces of the nut, are supported by the connector housing and the remaining one side surface is supported by the nut cover. Thus, a bolt tightening force, i.e. a rotational force of the nut about the tightening direction of the bolt, can be received by the connector housing and the nut cover during a bolt tightening operation. In this way, a position shift of the nut during the bolt tightening operation can be suppressed by the connector housing and the nut cover.

[5] Preferably, one of the upper and lower surfaces of the nut is supported by the connector housing constituting the inner surface of the accommodating portion, and the other of the upper and lower surfaces of the nut is supported by the terminal connecting portion.

According to this configuration, the upper and lower surfaces, which are end surfaces in the bolt tightening direction, of the nut are supported by the connector housing and the terminal connecting portion. Thus, even if an excessive load is applied to the nut from the bolt tightening direction, that load can be received by the connector housing and the terminal connecting portion high in rigidity. Therefore, the damage of the connector due to the above excessive load can be suppressed.

[6] Preferably, the nut cover includes a body portion having an end surface facing the nuts and a plurality of ribs formed to project in the inserting direction from the end surface of the body portion, and the plurality of ribs are in contact with the remaining one side surface of the nut. According to this configuration, one side surface of the nut is supported by the plurality of ribs of the nut cover. Thus, a bolt tightening force can be received by the plurality of ribs. Since a stress applied to the nut cover can be dispersed during the tightening of the bolt, the damage of the nut cover during the tightening of the bolt can be suppressed.

[7] Preferably, the nut cover includes a body portion having an end surface facing the nuts and a locking piece formed to project in the inserting direction from the end surface of the body portion, and the accommodating portion includes a locking portion to be locked to the locking piece. According to this configuration, the detachment of the nut cover from the accommodating portion can be suppressed by locking the locking piece of the nut cover to the locking portion of the accommodating portion.

[8] Preferably, a plurality of the nut covers are provided, the plurality of nut covers are individually accommodated in the plurality of accommodating portions, and the plurality of nut covers are formed to have the same shape and size. According to this configuration, since the plurality of nut covers are formed to have the same shape and size, components can be used in common.

Details of Embodiment of Present Disclosure

A specific example of a connector of the present disclosure is described below with reference to the drawings. Some of components may be shown in an exaggerated or simplified manner for the convenience of description in each figure. Further, a dimension ratio of each part may be different in each figure. "Parallel" and "orthogonal" in this specification mean not only strictly parallel and orthogonal, but also substantially parallel and orthogonal within a range in which functions and effects in this embodiment are achieved. Note that the present invention is not limited to these illustrations, but is represented by claims and intended to include all changes in the scope of claims and in the meaning and scope of equivalents.

(Overall Configuration of Electrically Conductive Path 10)

An electrically conductive path 10 shown in FIG. 1 electrically connects two, three or more electrical devices (devices). The electrically conductive path 10 includes a wiring harness 20 and a pair of device-side connectors 30 to be connected to both end parts of the wiring harness 20. For example, the electrically conductive path 10 electrically connects an inverter 11 installed in a front part of a vehicle such as a hybrid or electric vehicle and a high voltage battery 12 installed behind the inverter 11 in the vehicle. The electrically conductive path 10 is, for example, routed to pass below a floor of the vehicle. The inverter 11 is connected to a wheel drive motor (not shown) serving as a drive source of vehicle travel. The inverter 11 generates alternating current power from direct current power from the high voltage battery 12 and supplies the alternating current power to the motor. The high voltage battery 12 is, for example, a battery capable of supplying a voltage of several hundreds of volts.

(Configuration of Wiring Harness 20)

The wiring harness 20 includes a plurality of (two in this embodiment) wires 21, a pair of wire-side connectors 22 mounted on both end parts of the wires 21 and a protective tube 23 collectively surrounding the plurality of wires 21. One wire-side connector 22 is connected to the device-side connector 30 attached to the inverter 11, and the other wire-side connector 22 is connected to the device-side connector 30 attached to the high voltage battery 12. A pipe made of metal or resin, a flexible corrugated tube made of resin or the like, a waterproof cover made of rubber or a combination of these can be, for example, used as the protective tube 23. The protective tube 23 protects, for example, the wires 21 accommodated inside from flying objects and liquids.

Each connector 30 is fixed to an electrically conductive case 15 of the electrical device such as the inverter 11 or the high voltage battery 12. Each wire-side connector 22 is fit and electrically connected to each connector 30. The case 15 can be, for example, made of an iron-based or aluminum-based metal material.

(Configuration of Case 15)

Figure 2:
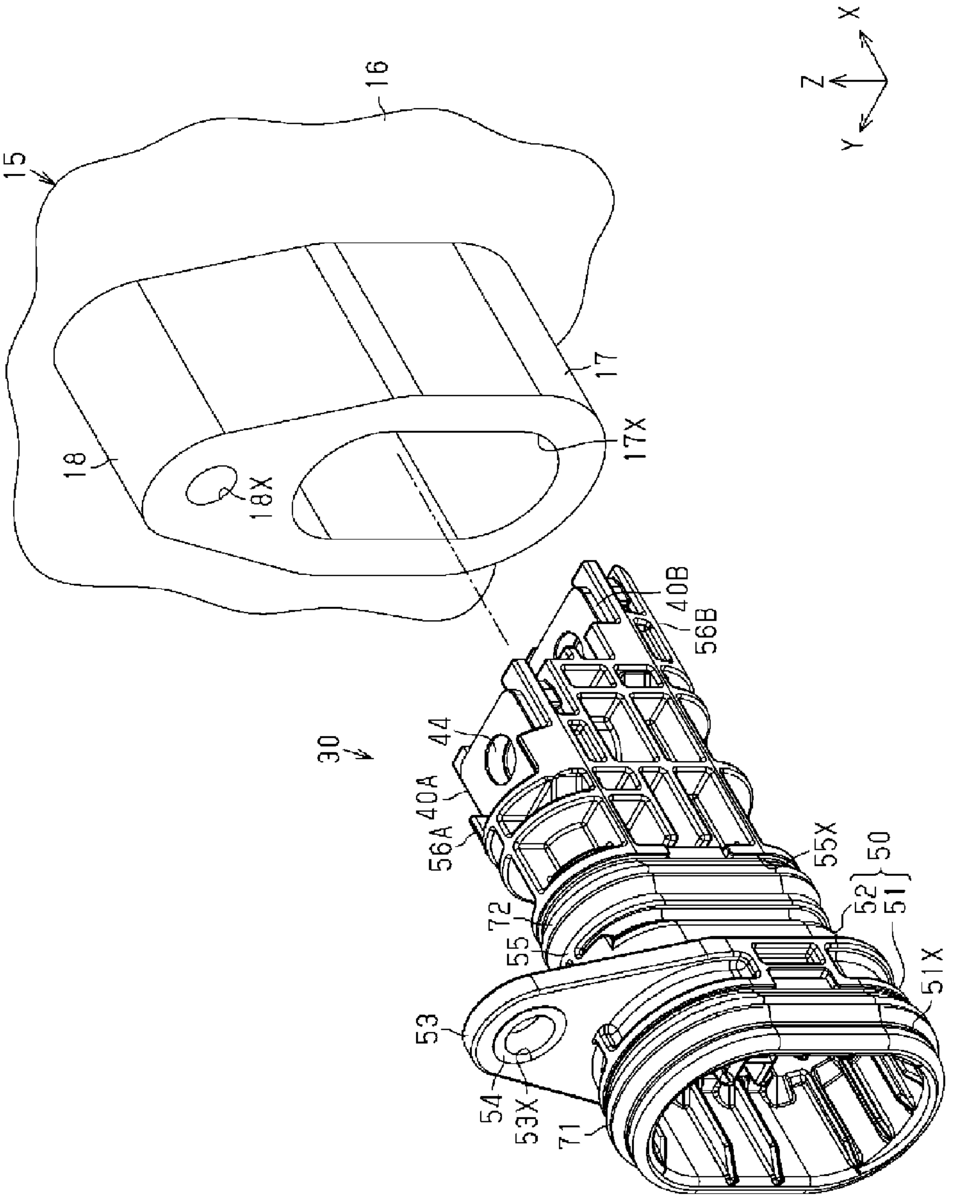
FIG. 2 is a schematic exploded perspective view showing a connector and a case of the embodiment.

As shown in FIG. 2, the case 15 includes a box-like case body 16 and a tubular mounting portion 17 integrally provided to the case body 16 and projecting to the outside of the case body 16. The mounting portion 17 is formed into a tubular shape by including a mounting hole 17X penetrating through the mounting portion 17. The mounting hole 17X is formed to allow communication between an internal space of the case body 16 and an external space of the case body 16. The mounting hole 17X is, for example, formed into a flat shape having a longitudinal direction and a transverse direction when viewed from a penetration direction. In this specification, examples of the "flat shape" include a rectangular shape, an oval shape, an elliptical shape and the like. The "oval shape" in this specification is a shape made up of two parallel lines having substantially equal lengths and two semicircles. The mounting hole 17X of this embodiment is formed into an oval shape when viewed from the penetration direction. The mounting portion 17 of this example is substantially in the form of an oval tube.

Note that, out of XYZ axes in each figure, an X axis represents a front-rear direction of the connector 30, a Y axis represents a lateral direction (width direction) of the connector 30 orthogonal to the X axis, and a Z axis represents a vertical direction (height direction) of the connector 30 orthogonal to an XY plane. In the following description, a direction along the X axis is referred to as a front-rear direction X, a direction extending along the Y axis is referred to as a lateral direction Y and a direction extending along the Z axis is referred to as a vertical direction Z for the sake of convenience. Further, in the following description, a direction of an arrow X and a direction of an arrow Z in FIG. 2 are assumed as a forward direction and an upward direction.

The case 15 includes a fixing portion 18 for fixing the connector 30 to the case 15. The fixing portion 18 is, for example, formed to project to the outside of the case body 16. The fixing portion 18 is, for example, integrally formed to the mounting portion 17. The fixing portion 18 is, for example, provided side by side with the mounting portion 17 in the vertical direction Z. The fixing portion 18 of this embodiment is provided above the mounting portion 17. The fixing portion 18 is formed with a bolt fixing hole 18X. The bolt fixing hole 18X is, for example, formed to extend in the front-rear direction X.

(Configuration of Connector 30)

Figure 3:
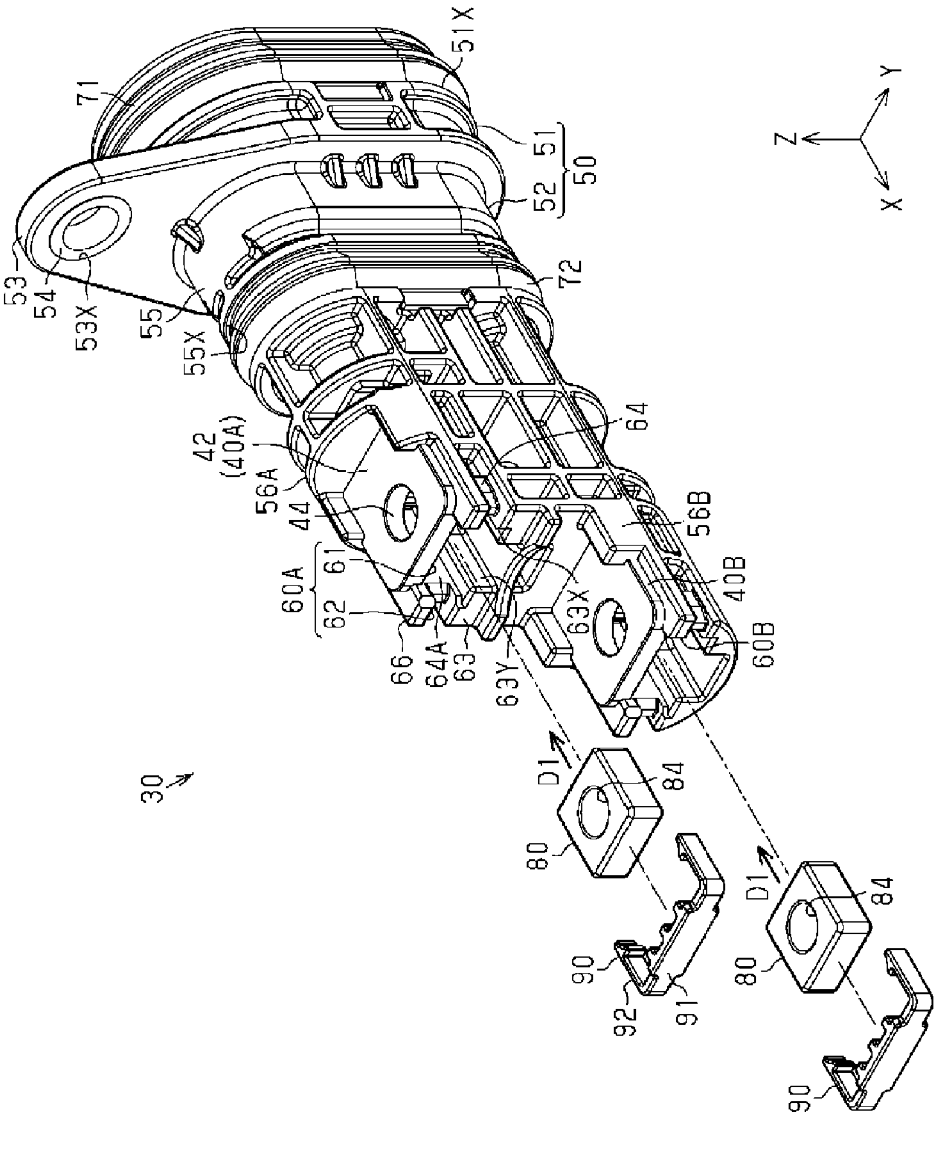
FIG. 3 is a schematic exploded perspective view showing the connector of the embodiment.
Figure 4:
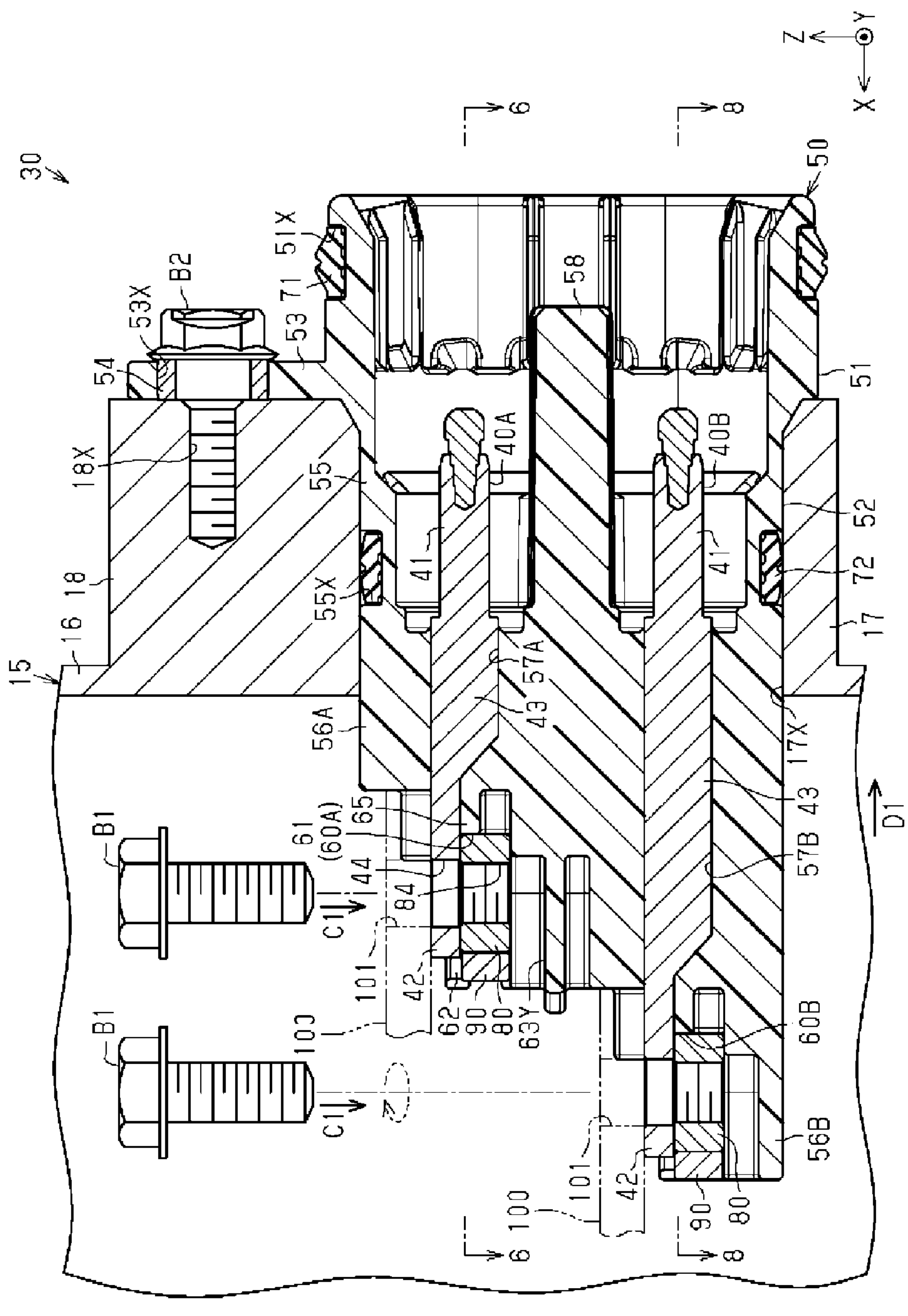
FIG. 4 is a schematic section showing the connector mounted in the case of the embodiment.

As shown in FIGS. 3 and 4, the connector 30 includes, for example, a plurality of (two in this embodiment) connection terminals 40A, 40B made of metal, a connector housing 50 having the connection terminals 40A, 40B mounted therein, and rubber rings 71, 72 mounted on the outer peripheral surface of the connector housing 50. The connector 30 includes, for example, a plurality of (two in this embodiment) nuts 80 and a plurality of (two in this embodiment) nut covers 90. The connector housing 50 is, for example, tubular.

(Configurations of Connection Terminals 40A, 40B)

As shown in FIG. 4, each connection terminal 40A, 40B is, for example, formed to extend along an axial direction (here, front-rear direction X) of the connector housing 50. The connection terminal 40A, 40B is, for example, formed into a shape longer in the axial direction of the connector housing 50 than in a direction (here, lateral direction Y) orthogonal to the axial direction of the connector housing 50. In this embodiment, a width direction of the connection terminal 40A, 40B coincides with the lateral direction Y, and a length direction of the connection terminal 40A, 40B coincides with the front-rear direction X.

Each connection terminal 40A, 40B includes a male terminal portion 41, a terminal connecting portion 42 and a coupling portion 43 coupling the male terminal portion 41 and the terminal connecting portion 42. Each connection terminal 40A, 40B is, for example, a single component in which the male terminal portion 41, the coupling portion 43 and the terminal connecting portion 42 are integrally formed by being connected in the length direction (here, front-rear direction X). A metal material such as copper, copper alloy, aluminum, aluminum alloy or stainless steel can be, for example, used as a material of each connection terminal 40A, 40B. Surface processing such as silver plating, tin plating or aluminum plating may be applied to each connection terminal 40A, 40B according to the type of the constituent metal thereof and a use environment.

The male terminal portion 41 is, for example, cylindrical. The male terminal portion 41 is, for example, formed to extend rearward from the coupling portion 43. The male terminal portion 41 is, for example, electrically connected to the wire 21 via a female terminal (not shown) provided in the wire-side connector 22 shown in FIG. 1.

The coupling portion 43 is, for example, cylindrical. The coupling portion 43 is, for example, formed to have a larger diameter than the male terminal portion 41. The coupling portion 43 is, for example, formed to extend forward from the male terminal portion 41. The coupling portion 43 is, for example, held in the connector housing 50. For example, the coupling portion 43 is integrally mounted in the connector housing 50.

The terminal connecting portion 42 is, for example, in the form of a flat plate. The terminal connecting portion 42 is, for example, formed to extend forward from a front end part of the coupling portion 43. The terminal connecting portion 42 is, for example, held in the connector housing 50. For example, the terminal connecting portion 42 is integrally mounted in the connector housing 50.

The terminal connecting portion 42 includes a through hole 44 penetrating through the terminal connecting portion 42 in a plate thickness direction (here, vertical direction Z). The through hole 44 is, for example, formed into a circular shape when viewed from a penetration direction (here, vertical direction Z).

The terminal connecting portion 42 is electrically connected to a mating terminal 100 in the internal space of the case body 16. Here, the mating terminal 100 is, for example, a connection terminal of the electrical device such as the inverter 11 or high voltage battery 12 shown in FIG. 1. The mating terminal 100 is, for example, a busbar in the form of a flat plate. The mating terminal 100 includes, for example, a through hole 101 penetrating in a plate thickness direction (here, vertical direction Z). The through hole 101 is, for example, formed into a circular shape when viewed from a penetration direction (here, vertical direction Z). Each connection terminal 40A, 40B is connected to the mating terminal 100 by a bolt B1. Each connection terminal 40A, 40B is connected to the mating terminal 100 by tightening the bolt B1 into the nut 80. Specifically, the mating terminal 100 is so provided on the upper surface of the terminal connecting portion 42 that the through hole 44 of the terminal connecting portion 42 and the through hole 101 of the mating terminal 100 overlap in the vertical direction Z. A shaft part of the bolt B1 is passed through the through holes 44, 101 from above along a tightening direction C1 (vertical direction Z in this embodiment) and the nut 80 is fastened to the shaft part of the bolt B1, whereby the terminal connecting portion 42 and the mating terminal 100 are connected. In this way, the connection terminal 40A, 40B and the mating terminal 100 are electrically connected. Here, the tightening direction C1 of the bolt B1 is, for example, a direction parallel to an axial direction of the shaft part of the bolt B1. Further, the tightening direction C1 of the bolt B1 is, for example, a direction parallel to a direction in which the shaft part of the bolt B1 is passed through the through holes 44, 101. Note that a metal material such as copper, copper alloy, aluminum, aluminum alloy or stainless steel can be, for example, used as a material of each mating terminal 100. Surface processing such as silver plating, tin plating or aluminum plating may be applied to each mating terminal 100 according to the type of the constituent metal thereof and a use environment.

The connection terminal 40B is, for example, formed longer than the connection terminal 40A. A dimension of the connection terminal 40B along the length direction is, for example, longer than that of the connection terminal 40A along the length direction. The connection terminals 40A, 40B are, for example, so set that dimensions of the coupling portions 43 along the length direction are different from each other. The coupling portion 43 of the connection terminal 40B is, for example, formed longer in the dimension along the length direction than the coupling portion 43 of the connection terminal 40A. Note that the male terminal portion 41 of the connection terminal 40A and the male terminal portion 41 of the connection terminal 40B are formed to have the same shape and dimensions. Further, the terminal connecting portion 42 of the connection terminal 40A and the terminal connecting portion 42 of the connection terminal 40B are formed to have the same shape and dimensions.

The plurality of connection terminals 40A, 40B are, for example, provided side by side along a direction (here, vertical direction Z) orthogonal to both the width direction (here, lateral direction Y) and the length direction (here, front-rear direction X) of the respective connection terminals 40A, 40B. The plurality of connection terminals 40A, 40B are, for example, provided side by side along the tightening direction C1 (here, vertical direction Z) of the bolts B1. The connection terminals 40A, 40B of this embodiment are arranged side by side along the Z axis. The plurality of connection terminals 40A, 40B are provided apart from each other in an arrangement direction (here, vertical direction Z) of those connection terminals 40A, 40B. The terminal connecting portion 42 of the connection terminal 40A and the terminal connecting portion 42 of the connection terminal 40B are provided apart from each other in the arrangement direction of the connection terminals 40A, 40B. In this embodiment, the connection terminal 40A is provided above the connection terminal 40B. The arrangement direction of the connection terminals 40A, 40B of this embodiment is a direction parallel to the tightening direction C1 of the bolts B1. The arrangement direction of the connection terminals 40A, 40B of this embodiment is a direction parallel to the plate thickness direction of the terminal connecting portions 42.

Figure 5:
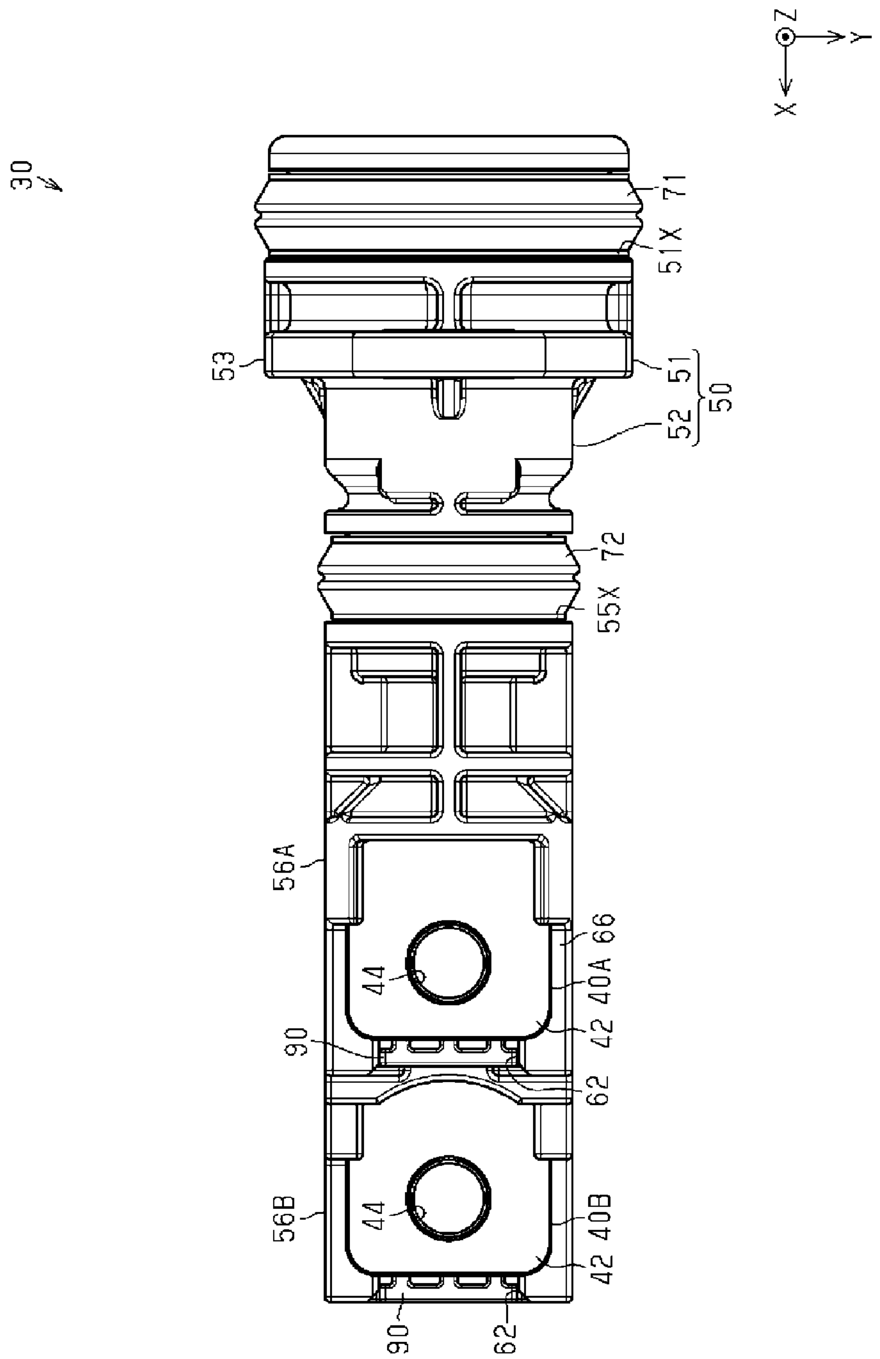
FIG. 5 is a schematic plan view showing the connector of the embodiment.

As shown in FIG. 5, the terminal connecting portion 42 of the connection terminal 40A and the terminal connecting portion 42 of the connection terminal 40B are provided at positions not overlapping each other in a plan view from the arrangement direction (here, vertical direction Z) of the connection terminals 40A, 40B. That is, in the plurality of connection terminals 40A, 40B, the terminal connecting portions 42 are provided at the positions not overlapping each other in the arrangement direction of the connection terminals 40A, 40B.

As shown in FIG. 4, the terminal connecting portion 42 of the connection terminal 40A and the terminal connecting portion 42 of the connection terminal 40B are, for example, provided at positions not overlapping each other in the tightening direction C1 of the bolts B1. The terminal connecting portion 42 of the connection terminal 40A and the terminal connecting portion 42 of the connection terminal 40B are, for example, provided at positions not overlapping each other in the direction (here, front-rear direction X) orthogonal to the arrangement direction of the connection terminals 40A, 40B. In this embodiment, the terminal connecting portion 42 of the connection terminal 40A and the terminal connecting portion 42 of the connection terminal 40B are provided at positions different from each other in the length direction of the connection terminals 40A, 40B. The terminal connecting portion 42 of the connection terminal 40B is, for example, formed to project further forward than the terminal connecting portion 42 of the connection terminal 40A. As described above, in this embodiment, the terminal connecting portion 42 of the connection terminal 40A and the terminal connecting portion 42 of the connection terminal 40B are arranged in a step-like manner. Note that the terminal connecting portion 42 of the connection terminal 40A and the terminal connecting portion 42 of the connection terminal 40B are provided at the same position in the width direction (here, lateral direction Y) of the connection terminals 40A, 40B.

In the plurality of connection terminals 40A, 40B, rear end parts of the male terminal portions 41 are provided at positions overlapping each other in the arrangement direction (here, vertical direction Z) of the connection terminals 40A, 40B. Further, the coupling portion 43 of the connection terminal 40B is, for example, formed to overlap the coupling portion 43 and the terminal connecting portion 42 of the connection terminal 40A in the vertical direction Z.

(Configuration of Connector Housing 50)

As shown in FIG. 2, the connector housing 50 is, for example, substantially in the form of a tube extending in the front-rear direction X. The connector housing 50 is, for example, formed to have a flat shape longer in the vertical direction Z than in the lateral direction Y. The connector housing 50 includes a receptacle 51 to be arranged outside the case 15 and an inserting portion 52 to be inserted into the mounting hole 17X of the case 15. The connector housing 50 is, for example, a single component in which the receptacle 51 and the inserting portion 52 are continuously and integrally formed in the axial direction of the connector housing 50. An insulating material such as a synthetic resin can be, for example, used as a material of the connector housing 50.

(Configuration of Receptacle 51)

The receptacle 51 is, for example, formed into a flat shape longer in the vertical direction Z than in the lateral direction Y. The receptacle 51 is, for example, in the form of a tube having an oval outer peripheral shape and extending in the front-rear direction X. The receptacle 51 of this embodiment is in the form of an oval tube. A fixing portion 53 protruding radially outwardly of the receptacle 51 is formed on the outer peripheral surface of the front end of the receptacle 51. The fixing portion 53 is, for example, substantially in the form of a plate. The fixing portion 53 is formed with a bolt insertion hole 53X penetrating through the fixing portion 53 in a plate thickness direction (here, front-rear direction X).

As shown in FIG. 4, a collar 54 made of metal, through which a fixing bolt B2 is insertable, is mounted in the bolt insertion hole 53X. The connector housing 50 is fixed to the case 15 by screwing the fixing bolt B2 into the bolt insertion hole 53X of the fixing portion 53 and the bolt fixing hole 18X provided in the fixing portion 18 of the case 15. Thus, the fixing portion 53 of the connector housing 50 is arranged outside the case 15.

An accommodation groove 51X, in which the rubber ring 71 is, for example, accommodated, is formed in the outer peripheral surface of the receptacle 51 behind the fixing portion 53. The accommodation groove 51X is, for example, formed over the entire periphery in a circumferential direction of the outer peripheral surface of the receptacle 51. The rubber ring 71 is fit in the accommodation groove 51X. For example, the rubber ring 71 seals between the outer peripheral surface of the receptacle 51 and the inner peripheral surface of the wire-side connector 22 when the connector 30 and the wire-side connector 22 (see FIG. 1) are connected.

(Configuration of Inserting Portion 52)

The inserting portion 52 is formed to project forward from the front end of the receptacle 51. The inserting portion 52 includes a tubular tube portion 55 and terminal holding portions 56A, 56B formed to project further forward than the tube portion 55.

(Configuration of Tube Portion 55)

The tube portion 55 is, for example, in the form of a tube having an outer peripheral surface shaped to correspond to the inner peripheral surface of the mounting hole 17X. The tube portion 55 is, for example, in the form of a tube having an oval outer peripheral shape and extending in the front-rear direction X. The tube portion 55 of this embodiment is in the form of an oval tube.

An accommodation groove 55 for accommodating the rubber ring 72 is, for example, formed in the outer peripheral surface of the tube portion 55. The accommodation groove 55X is, for example, formed over the entire periphery in a circumferential direction of the outer peripheral surface of the tube portion 55. The rubber ring 72 is fit in the accommodation groove 55X. The rubber ring 72 seals between the outer peripheral surface of the connector housing 50 and the inner peripheral surface of the mounting hole 17X when the inserting portion 52 is fit into the mounting hole 17X.

(Configurations of Terminal Holding Portions 56A, 56B)

The terminal holding portions 56A, 56B are, for example, provided on the back wall of the tube portion 55. The terminal holding portions 56A, 56B are, for example, formed to project forward from the back wall of the tube portion 55. The terminal holding portions 56A, 56B are provided to partially or entirely project further forward than the mounting hole 17X into the internal space of the case 15.

The terminal holding portion 56A holds the connection terminal 40A. The terminal holding portion 56B holds the connection terminal 40B. The plurality of terminal holding portions 56A, 56B are, for example, integrally formed side by side in the vertical direction Z. A dimension of the terminal holding portion 56B is, for example, longer than that of the terminal holding portion 56A in the axial direction of the connector housing 50. A front end part of the terminal holding portion 56B is formed to project further forward than that of the terminal holding portion 56A. The front end part of the terminal holding portion 56B is exposed from that of the terminal holding portion 56A. The terminal connecting portion 42 of the connection terminal 40A is held in the front end part of the terminal holding portion 56A. The terminal connecting portion 42 of the connection terminal 40B is held in the front end part of the terminal holding portion 56B. A stepwise level difference is, for example, formed in the front end parts of the terminal holding portions 56A, 56B.

For example, the terminal holding portions 56A, 56B respectively include holding holes 57A, 57B. The holding holes 57A, 57B are, for example, formed to respectively penetrate through the terminal holding portions 56A, 56B in the front-rear direction X. For example, the connection terminals 40A, 40B are respectively held inside the holding holes 57A, 57B. In the connector 30, for example, the connection terminal 40A is integrated with the terminal holding portion 56A and the connection terminal 40B is integrated with the terminal holding portion 56B. For example, the connection terminals 40A, 40B are integrally mounted in the terminal holding portions 56A, 56B by insert molding or the like. For example, the terminal connecting portions 42 and the coupling portions 43 of the connection terminals 40A, 40B are integrally mounted in the terminal holding portions 56A, 56B by insert molding or the like.

Here, the male terminal portions 41 of the respective connection terminals 40A, 40B are formed to project rearward from the back wall of the tube portion 55 toward the receptacle 51. Each male terminal portion 41 is, for example, formed to extend to the vicinity of the rear end of the tube portion 55. A partition wall 58 is, for example, formed between the plurality of these male terminal portions 41. The partition wall 58 is, for example, provided between two male terminal portions 41 arranged side by side in the vertical direction Z and formed to extend rearward along the front-rear direction X from the back wall of the tube portion 55. The partition wall 58 is, for example, formed to extend up to the internal space of the receptacle 51.

(Configurations of Accommodating Portions 60A, 60B)

The connector housing 50 includes a plurality of accommodating portions 60A, 60B. The accommodating portion 60A is, for example, provided in the front end part of the terminal holding portion 56A. The accommodating portion 60A is, for example, provided at a position overlapping the terminal connecting portion 42 of the connection terminal 40A in a plan view from the tightening direction C1 of the bolt B1. The accommodating portion 60B is, for example, provided in the front end part of the terminal holding portion 56B. The accommodating portion 60B is, for example, provided at a position overlapping the terminal connecting portion 42 of the connection terminal 40B in a plan view from the tightening direction C1 of the bolt B1. As shown in FIG. 3, the plurality of the nuts 80 are individually accommodated into the plurality of accommodating portions 60A, 60B. The plurality of nut covers 90 are individually accommodated into the plurality of accommodating portions 60A, 60B. Each nut 80 is inserted and accommodated into each accommodating portion 60A, 60B along an inserting direction D1. Each nut cover 90 is inserted and accommodated into each accommodating portion 60A, 60B along an inserting direction D1. In this embodiment, the inserting direction D1 of each nut 80 into each accommodating portion 60A, 60B and the inserting direction D1 of each nut cover 90 into each accommodating portion 60A, 60B are set in the same direction. The inserting direction D1 of this embodiment is a direction parallel to the front-rear direction X and from front to rear of the front-rear direction X. As shown in FIG. 4, the inserting direction D1 of this embodiment is set to be a direction intersecting the tightening direction C1 of the bolts B1. The inserting direction D1 of this embodiment is set to be a direction parallel to the length direction of the respective connection terminals 40A, 40B. The plurality of accommodating portions 60A, 60B are, for example, provided apart from each other in the arrangement direction of the connection terminals 40A, 40B and provided at positions not overlapping each other in a plan view from the arrangement direction.

(Configuration of Nuts 80)

Here, the configuration of the nuts 80 is described.

As shown in FIG. 3, each nut 80 is, for example, in the form of a rectangular prism. Each nut 80 has an upper surface, a lower surface opposite to the upper surface in the vertical direction Z and four side surfaces provided between the upper and lower surfaces. Each nut 80 includes a through hole 84 penetrating through the nut 80 in a thickness direction. Each through hole 84 is, for example, formed to penetrate from the upper surface to the lower surface of the nut 80. Each through hole 84 is, for example, formed into a circular shape when viewed from a penetration direction (here, vertical direction Z) of the through hole 84. Each through hole 84 is, for example, formed in centers of the upper and lower surfaces. Each through hole 84 is formed to overlap the through hole 44 of the terminal connecting portion 42 in the vertical direction Z with each nut 80 accommodated in the accommodating portion 60A, 60B. The nut 80 is formed into a rectangular planar shape when viewed from the penetration direction of the through hole 84.

(Configuration of Accommodating Portion 60A)

Next, the structure of the accommodating portion 60A is described.

The accommodating portion 60A includes, for example, a nut accommodating portion 61 for accommodating the nut 80 and a nut cover accommodating portion 62 for accommodating the nut cover 90. The nut cover accommodating portion 62 is, for example, provided outside the nut accommodating portion 61.

(Configuration of Nut Accommodating Portion 61)

The nut accommodating portion 61 is, for example, provided in the front end part of the terminal holding portion 56A. The nut accommodating portion 61 is, for example, provided in a lower part of the front end part of the terminal holding portion 56A. The nut accommodating portion 61 is, for example, formed to be open forward.

Figure 6:
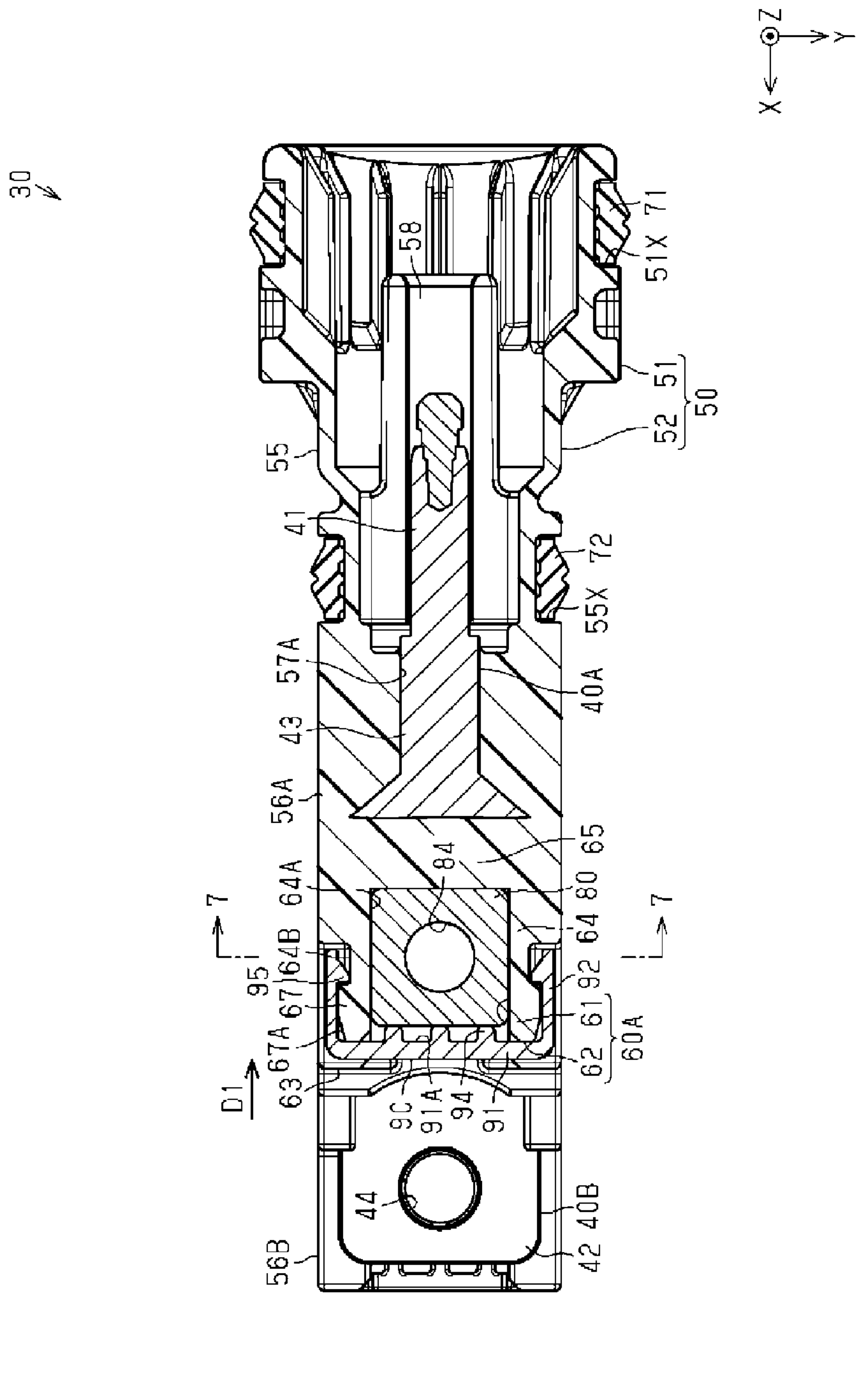
FIG. 6 is a schematic section (section along 6-6 in FIG. 4) showing the connector of the embodiment.

As shown in FIGS. 3 and 6, the nut accommodating portion 61 is, for example, constituted by a base portion 63, a pair of side wall portions 64 formed on the upper surface of the base portion 63, a back wall portion 65 formed between the pair of side wall portions 64, an upper wall portion 66 provided to face the base portion 63 and the lower surface of the terminal connecting portion 42 held on the upper wall portion 66.

Here, "facing each other" in this specification indicates that surfaces or members are at positions opposite to each other, and means not only a case where the surfaces or members are completely at the positions opposite to each other, but also a case where the surfaces or members are partly at the positions opposite to each other. Further, "facing each other" in this specification means both a case where another member different from two members is interposed between the two members and a case where nothing is interposed between the two members.

As shown in FIG. 3, each side wall portion 64 is, for example, formed to project upward from the upper surface of the base portion 63. Each side wall portion 64 is, for example, formed to rise upward continuously from the upper surface of the base portion 63. Each side wall portion 64 extends, for example, in the front-rear direction X. Each side wall portion 64 is, for example, formed at a position separated rearward from the front end surface of the base portion 63. For example, each side wall portion 64 is formed to extend rearward along the front-rear direction X from the position separated rearward from the front end surface of the base portion 63. The pair of side wall portions 64 are provided apart from each other in the lateral direction Y.

As shown in FIG. 6, each side wall portion 64 has a side surface 64A constituting the inner surface of the nut accommodating portion 61, a side surface 64B constituting the outer surface of the nut accommodating portion 61 and an upper surface provided between the side surfaces 64A and 64B. Each side surface 64A is, for example, formed into a flat surface. The pair of side surfaces 64A are, for example, facing each other in the lateral direction Y. An interval between the pair of side surfaces 64A is, for example, equal to a length in the lateral direction Y of the nut 80. Each side surface 64A is, for example, in contact with a side surface of the nut 80 accommodated in the nut accommodating portion 61.

Here, "equal" in this specification may also mean a case where objects to be compared are slightly different due to dimensional tolerances and the like besides a case of being precisely equal.

As shown in FIG. 3, the upper surface of the base portion 63 located between the pair of side wall portions 64 is formed with a recess 63X recessed downward from that upper surface. The bottom surface of the recess 63X constitutes, for example, the bottom surface of the nut accommodating portion 61. The inner side surfaces of the recess 63X are continuously and integrally formed with the side surfaces 64A of the respective side wall portions 64. For example, the inner side surfaces of the recess 63X are formed to be continuous with the side surfaces 64A without any step.

A recess 63Y is, for example, formed in the bottom surface of the recess 63X. The recess 63Y is, for example, formed to be recessed downward from the bottom surface of the recess 63X. The recess 63Y is, for example, provided at a position overlapping the through hole 44 of the terminal connecting portion 42 in the vertical direction Z. As shown in FIG. 4, the tip of the shaft part of the bolt B1 passed through the through hole 101 of the mating terminal 100, the through hole 44 of the terminal connecting portion 42 and the through hole 84 of the nut 80 is, for example, accommodated in the recess 63Y.

As shown in FIG. 6, the back wall portion 65 is, for example, provided on the rear end of the nut accommodating portion 61. The back wall portion 65 is, for example, formed to connect rear end parts of the pair of side wall portions 64. For example, the back wall portion 65 extends in the lateral direction Y. The back wall portion 65 is, for example, formed to project upward from the upper surface of the base portion 63 similarly to each side wall portion 64. A height in the vertical direction Z of the back wall portion 65 is, for example, equal to those of the side wall portions 64. The back wall portion 65 has a back wall surface constituting the inner surface of the nut accommodating portion 61.

Figure 7:
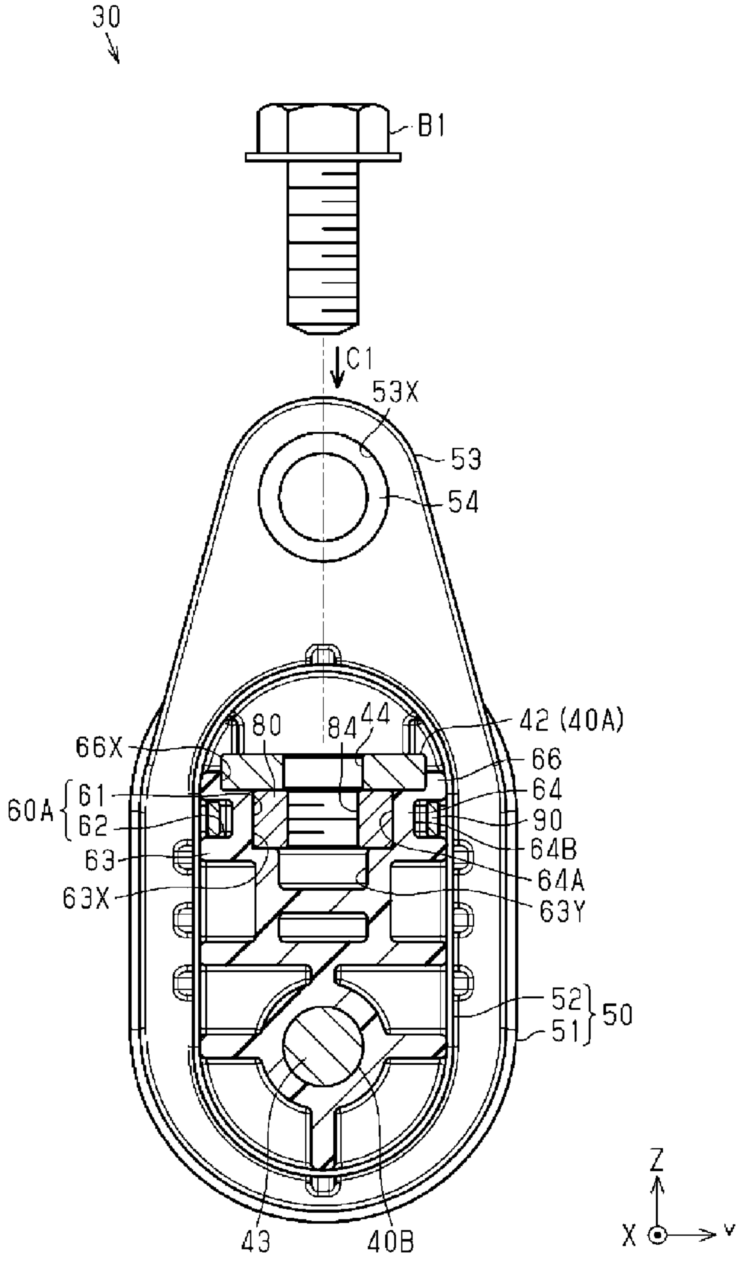
FIG. 7 is a schematic section (section along 7-7 in FIG. 6) showing the connector of the embodiment.

As shown in FIG. 7, the upper wall portion 66 is, for example, formed on the upper surfaces of the pair of side wall portions 64. The planar shape of the upper wall portion 66 viewed from the vertical direction Z is, for example, equal to that of the base portion 63. However, the upper wall portion 66 is not formed in a part overlapping the bottom surface of the recess 63X of the base portion 63 in the vertical direction Z. In other words, the upper wall portion 66 is formed with an opening for exposing the entire bottom surface of the recess 63X.

An accommodation recess 66X for accommodating the terminal connecting portion 42 is formed in the upper surface of the upper wall portion 66. The accommodation recess 66X is, for example, formed to be recessed downward from the upper surface of the upper wall portion 66. The accommodation recess 66X is, for example, formed in a part overlapping the side wall portions 64 and the back wall portion 65 (see FIG. 6) in the vertical direction Z. The planar shape of the accommodation recess 66X viewed from the vertical direction Z is equal to that of the terminal connecting portion 42. The terminal connecting portion 42 is, for example, accommodated in the accommodation recess 66X. The terminal connecting portion 42 is, for example, integrated with the upper wall portion 66. For example, the terminal connecting portion 42 is integrated with the upper wall portion 66 by insert molding or the like. At this time, a part of the lower surface of the terminal connecting portion 42, specifically a part overlapping the bottom surfaces of the recesses 63X, 63Y in the vertical direction Z, out of the lower surface of the terminal connecting portion 42, is exposed from the bottom surface of the accommodation recess 66X.

Here, a height in the vertical direction Z from the bottom surface of the recess 63X to that of the accommodation recess 66X is, for example, equal to that of the nut 80. Specifically, a height in the vertical direction Z from the bottom surface of the recess 63X to the lower surface of the terminal connecting portion 42 is, for example, equal to that of the nut 80.

The nut accommodating portion 61 is constituted by a space surrounded by the bottom surface and inner side surfaces of the recess 63X of the base portion 63, the side surfaces 64A of the side wall portions 64, the back wall surface of the back wall portion 65 (see FIG. 6) and the lower surface of the terminal connecting portion 42 facing the bottom surface of the recess 63X, which are described above.

As shown in FIG. 3, the nut 80 is inserted into the nut accommodating portion 61 from front along the inserting direction D1. The nut 80 is, for example, accommodated into the nut accommodating portion 61 by being press-fit into the nut accommodating portion 61 along the inserting direction D1. As shown in FIG. 6, each nut 80 is inserted into the nut accommodating portion 61 along the inserting direction D1 until one side surface contacts the back wall portion 65 of the nut accommodating portion 61. As shown in FIGS. 6 and 7, the nut 80 accommodated in the nut accommodating portion 61 is, for example, in such a state that the lower surface is in contact with the bottom surface of the recess 63X, the upper surface is in contact with the lower surface of the terminal connecting portion 42 and the side surfaces are in contact with the side surfaces 64A of the side wall portions 64 and the back wall surface of the back wall portion 65. At this time, as shown in FIG. 7, the through hole 84 of the nut 80 is provided to overlap the through hole 44 of the terminal connecting portion 42 in a plan view from the tightening direction C1 of the bolt B1.

(Configuration of Nut Cover Accommodating Portion 62)

Next, the configuration of the nut cover accommodating portion 62 is described.

The upper wall portion 66 is, for example, formed to protrude further outward than the side surfaces 64B of the respective side wall portions 64 in the lateral direction Y. The base portion 63 is, for example, formed to protrude further outward than the side surfaces 64B of the respective side wall portions 64 in the lateral direction Y. As shown in FIG. 3, the upper wall portion 66 is, for example, formed to protrude further forward than the front end surfaces of the respective side wall portions 64 in the front-rear direction X. The base portion 63 is, for example, formed to protrude further forward than the front end surfaces of the respective side wall portions 64 in the front-rear direction X. For example, parts of the upper wall portion 66 projecting further outward or forward than the side wall portions 64 are facing the upper surface of the base portion 63. The nut cover accommodating portion 62 for accommodating the nut cover 90 is constituted by a space surrounded by the side wall portions 64, parts of the upper surface of the base portion 63 projecting further outward or forward than the side wall portions 64 and parts of the lower surface of the upper wall portion 66 projecting further outward or forward than the side wall portions 64. The nut cover accommodating portion 62 is, for example, formed to surround the nut accommodating portion 61 from outside. For example, the nut cover accommodating portion 62 is formed to surround the nut accommodating portion 61 from outside in the lateral direction Y and from front in the front-rear direction X. The nut cover accommodating portion 62 is, for example, formed to be open forward.

As shown in FIG. 6, the side wall portions 64 constituting the nut cover accommodating portion 62 include, for example, locking portions 67 to be locked to the nut cover 90. Each locking portion 67 is, for example, formed to project outward along the lateral direction Y from the side surface 64B of the side wall portion 64. Each locking portion 67 is, for example, provided on a front side of the side surface 64B in the front-rear direction X. A guide surface 67A is, for example, formed on a front end part of each locking portion 67. The guide surface 67A is formed on a surface of the locking portion 67 located outward in the lateral direction Y. The guide surface 67A is, for example, formed to expand outward toward a rear side from the front end surface of the locking portion 67. The guide surface 67A is, for example, inclined to expand outward in the lateral direction Y toward the rear side from the front end surface of the locking portion 67 in a plan view from a direction (here, vertical direction Z) orthogonal to the inserting direction D1 of the nut cover 90.

(Configuration of Accommodating Portion 60B)

Figure 8:
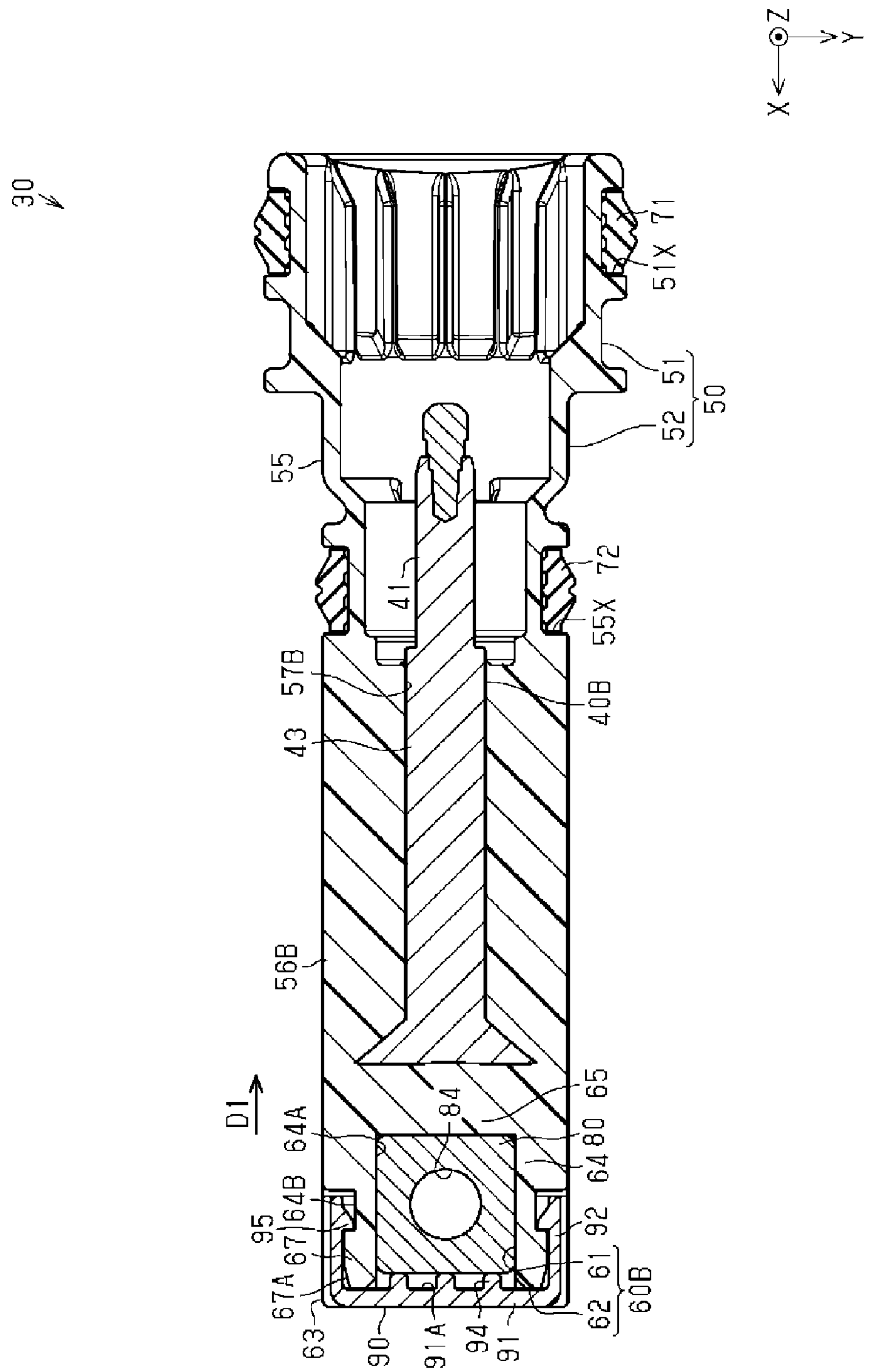
FIG. 8 is a schematic section (section along 8-8 in FIG. 4) showing the connector of the embodiment.

As shown in FIG. 8, the accommodating portion 60B includes, for example, a nut accommodating portion 61 for accommodating the nut 80 and a nut cover accommodating portion 62 for accommodating the nut cover 90. That is, the accommodating portion 60B has substantially the same structure as the accommodating portion 60A shown in FIG. 6. Thus, the same members as those of the accommodating portion 60A are respectively denoted by the same reference signs and each of those elements is not described in detail.

(Configuration of Nut Cover 90)

Next, the configuration of the nut cover 90 is described.

As shown in FIG. 3, the plurality of nut covers 90 are, for example, components separate from the connector housing 50. The plurality of nut covers 90 are, for example, formed to have the same shape and size.

Figure 9:
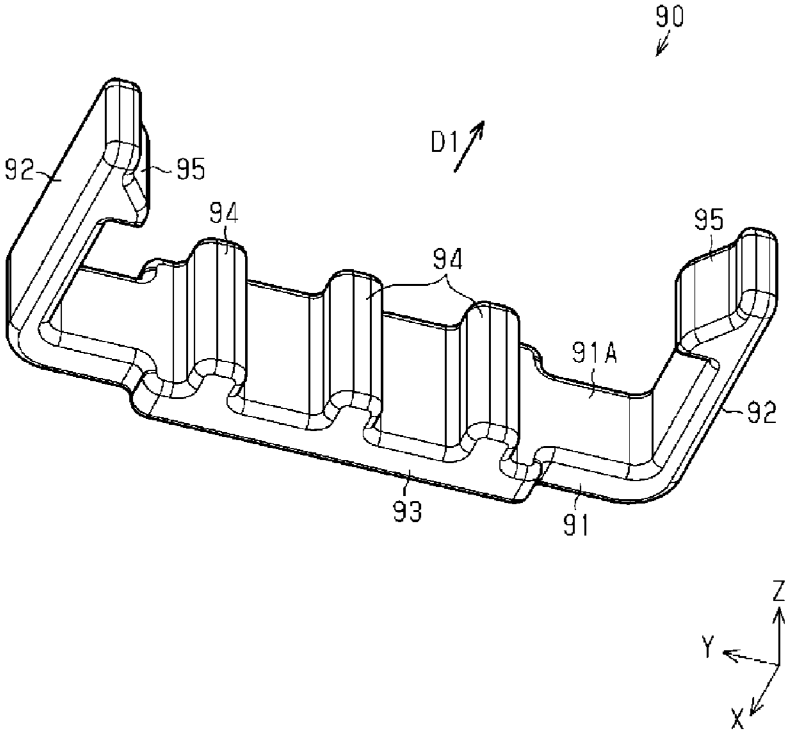
FIG. 9 is a schematic perspective view showing a nut cover of the embodiment.

As shown in FIG. 9, each nut cover 90 is, for example, in the form of a flat plate. Each nut cover 90 includes a flat plate-like body portion 91 and a pair of locking pieces 92 formed on an end surface 91A of the body portion 91. Each nut cover 90 is, for example, an integral component in which the body portion 91 and the pair of locking pieces 92 are continuously and integrally formed. Each nut cover 90 has, for example, a U-shaped planar shape when viewed from the vertical direction Z. An insulating material such as a synthetic resin can be, for example, used as a material of each nut cover 90.

(Configuration of Body Portion 91)

The body portion 91 is, for example, formed longer in the lateral direction Y than in the vertical direction Z. The body portion 91 is, for example, in the form of a strip having a predetermined width in the vertical direction Z. A wide portion 93 formed wider in the vertical direction Z than other parts is formed in a central part in the lateral direction Y of the body portion 91. A plurality of (three in this embodiment) ribs 94 projecting rearward along the inserting direction D1 from the end surface 91A is formed on the end surface 91A of the wide portion 93. Here, as shown in FIG. 6, the end surface 91A of the body portion 91 is an end surface facing the nut 80. The plurality of ribs 94 are, for example, provided apart from each other in the lateral direction Y. The plurality of ribs 94 are, for example, equal in projection amount from the end surface 91A, i.e. length along the inserting direction D1. The plurality of ribs 94 are, for example, in contact with the side surface of the nut 80 accommodated in the nut accommodating portion 61. As shown in FIG. 9, each rib 94 extends, for example, in the vertical direction Z. Each rib 94 extends, for example, over the entire length in the vertical direction Z of the wide portion 93.

(Configuration of Locking Pieces 92)

Each locking piece 92 is, for example, provided on each end part in the lateral direction Y of the body portion 91. The pair of locking pieces 92 are provided to face each other in the lateral direction Y. Each locking piece 92 projects rearward along the inserting direction D1 from the end surface 91A of the body portion 91. Each locking piece 92 is in the form of a cantilever having a base end part connected to the body portion 91 as a fixed end and a tip part located on a side opposite to the base end part in the inserting direction D1 as a free end. Each locking piece 92 has springiness. Each locking piece 92 is, for example, configured to be deflectable in the lateral direction Y by resilient deformation. In the nut cover 90, a distance in the lateral direction Y between the pair of locking pieces 92 can be changed by resilient deformation. The pair of locking pieces 92 are, for example, set to have the same projection amount from the end surface 91A, i.e. the same length along the inserting direction D1. A dimension of each locking piece 92 is, for example, longer than each rib 94 in the inserting direction D1. A locking portion 95 projecting in the lateral direction Y is, for example, formed on the tip part of each locking piece 92. Each locking portion 95 projects inward in the lateral direction Y. A pair of the locking portions 95 are, for example, provided to face each other in the lateral direction Y.

As shown in FIG. 3, each nut cover 90 is inserted and accommodated into the nut cover accommodating portion 62 from front along the inserting direction D1. That is, each nut cover 90 is inserted into the nut cover accommodating portion 62 along the same inserting direction D1 as the inserting direction D1 of the nut 80. The plurality of nut covers 90 are individually accommodated into the nut cover accommodating portions 62 of the plurality of accommodating portions 60A, 60B. As shown in FIGS. 6 and 8, if the nut cover 90 is accommodated into the nut cover accommodating portion 62, the locking portions 95 of the respective locking pieces 92 are locked to the locking portions 67 of the nut cover accommodating portion 62. In particular, if the nut cover 90 is inserted into the nut cover accommodating portion 62 along the inserting direction D1, the pair of locking pieces 92 are resiliently displaced to be deflected outward in the lateral direction Y while the respective locking portions 95 slide on the guide surfaces 67A of the respective locking portions 67. In this way, the locking portions 95 move to a back side (right side in figures) in the inserting direction D1 beyond the locking portions 67. If the locking portions 95 move to the back side in the inserting direction D beyond the locking portions 67, the pair of locking pieces 92 resiliently return to initial shapes and the respective locking portions 95 are locked to the respective locking portions 67. Specifically, the front surfaces of the respective locking portions 95 are locked to the rear surfaces of the respective locking portions 67. If these locking portions 95, 67 are locked, the escape of the nut cover 90 from the nut cover accommodating portion 62 is suppressed. If the nut cover 90 is accommodated into the nut cover accommodating portion 62, the rear end surfaces of the plurality of ribs 94 of the nut cover 90 contact the side surface of the nut 80. A movement of the nut 80 in a direction (here, direction of an arrow X) opposite to the inserting direction D1 can be restricted by the nut cover 90. Here, the end surface 91A of the body portion 91 of the nut cover 90 accommodated in the nut cover accommodating portion 62 is in contact with the front end surfaces of the respective side wall portions 64. Further, the respective locking pieces 92 are accommodated outside the side surfaces 64B along the side surfaces 64B of the respective side wall portions 64 in the nut cover accommodating portion 62.

Figure 10:
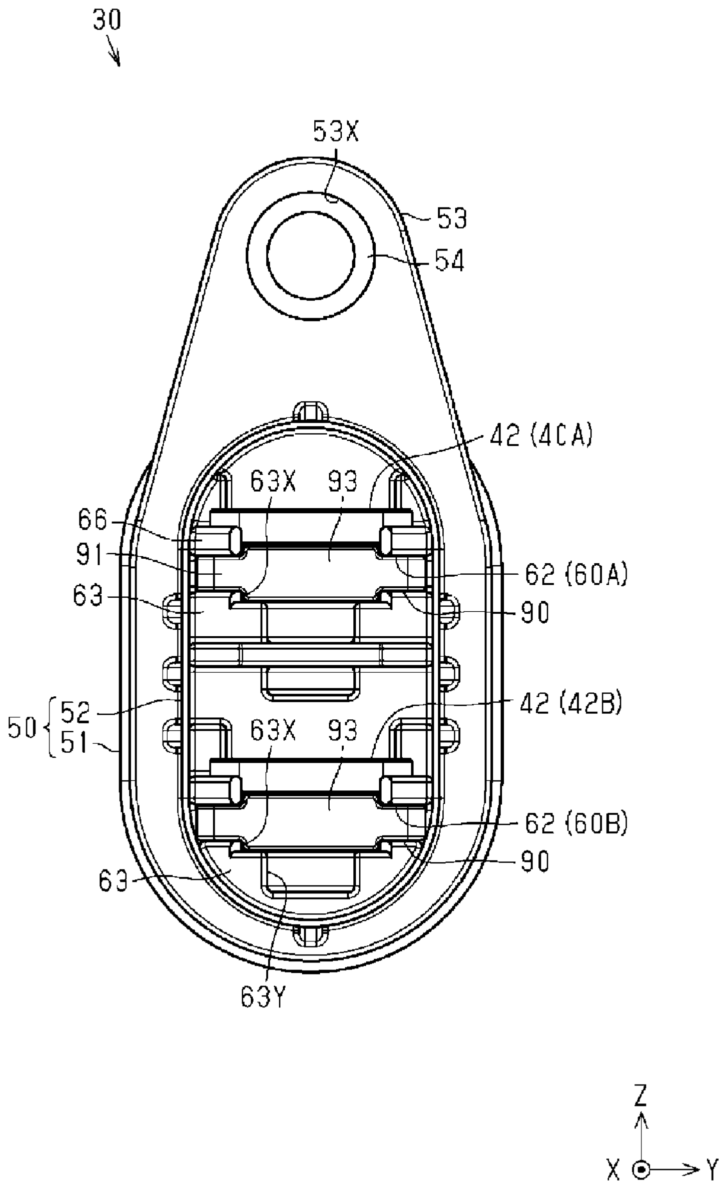
FIG. 10 is a schematic front view showing the connector of the embodiment.

As shown in FIG. 10, parts of the body portion 91 of the nut cover 90 other than the wide portion 93 are accommodated between the upper wall portion 66 and the base portion 63 in the nut cover accommodating portion 62. Further, the wide portion 93 is, for example, accommodated in the recess 63X of the base portion 63 and accommodated in the opening of the upper wall portion 66 for exposing the bottom surface of the recess 63X in the nut cover accommodating portion 62.

Here, as shown in FIGS. 6 and 8, three side surfaces, out of the four side surfaces of the nut 80, are supported by the connector housing 50 constituting the inner surface of the nut accommodating portion 61 and the remaining one side surface is supported by the nut cover 90 in each accommodating portion 60A, 60B. Further, as shown in FIG. 7, the lower surface of each nut 80 is supported by the connector housing 50 (specifically, bottom surface of the recess 63X) constituting the nut accommodating portion 61 and the upper surface of each nut 80 is supported by the lower surface of the terminal connecting portion 42 exposed to the nut accommodating portion 61 in each nut accommodating portion 61. In this way, each nut 80 is restricted from moving and rotating about a center axis of the through hole 84 in each nut accommodating portion 61.

(Connection Method of Connection Terminals 40A, 40B and Mating Terminals 100)

Next, a connection method of the connection terminals 40A, 40B and the mating terminals 100 are described.

As shown in FIG. 4, the connector 30 is prepared which is fixed to the case 15 by the fixing bolt B2 and in which the nuts 80 and the nut cover 90 are respectively accommodated in the accommodating portions 60A, 60B.

Subsequently, the mating terminal 100 is connected to the connection terminal 40B, out of the connection terminals 40A, 40B. In particular, the mating terminal 100 is overlapped on the upper surface (also referred to as a contact surface) of the terminal connecting portion 42 of the connection terminal 40B. Specifically, in a plan view of the through hole 101 of the mating terminal 100 from the tightening direction C1 of the bolt B1, the mating terminal 100 is so overlapped on the upper surface (also referred to as the contact surface) of the terminal connecting portion 42 of the connection terminal 40B that the through hole 44 of the terminal connecting portion 42 of the connection terminal 40B and the through hole 84 of the nut 80 overlap. At this time, the plurality of terminal connecting portions 42 are provided apart from each other in the arrangement direction of the connection terminals 40A, 40B, and provided at positions not overlapping each other in the plan view from the arrangement direction. Thus, the terminal connecting portion 42 of the connection terminal 40A and the terminal connecting portion 42 of the connection terminal 40B are, for example, not adjacently arranged in three directions including the arrangement direction and the front-rear direction X and lateral direction Y orthogonal to the arrangement direction. Therefore, the mating terminal 100 can be pulled out at least in two directions including the front-rear direction X and lateral direction Y except the arrangement direction, which is a direction parallel to the tightening direction C1 of the bolt B1, out of the three directions including the arrangement direction, front-rear direction X and lateral direction Y. In other words, the mating terminal 100 can be connected to the terminal connecting portion 42 of the connection terminal 40B at least from two directions. Note that the mating terminal 100 is connected to the terminal connecting portion 42 of the connection terminal 40B from the front-rear direction X in the shown example.

Subsequently, the shaft part of the bolt B1 is passed through the through holes 101, 44 from above along the tightening direction C1 and screwed into the through hole 84 of the nut 80 restricted from rotating in the accommodating portion 60B. For example, the nut 80 is fastened to the shaft part of the bolt B1 passed through the through holes 101, 44 and the terminal connecting portion 42 and the mating terminal 100 are connected by tightening the bolt B by a tool such as a wrench. At this time, a tightening force of the bolt B1 (see a broken-line arrow in FIG. 4), i.e. a rotational force of the nut 80 about the tightening direction C1 of the bolt B1, can be received by the connector housing 50 and the nut cover 90. That is, the tightening force of the bolt B1 can be received by the connector housing 50 for restricting the rotation of the nut 80 by contacting three side surfaces of the nut 80 and the nut cover 90 for restricting the rotation of the nut 80 by contacting one side surface of the nut 80. Thus, a position shift of the nut 80 due to the tightening force of the bolt B can be suppressed during a tightening operation of the bolt B1. At this time, the nut cover 90 can receive the tightening force of the bolt B by the plurality of ribs 94 (see FIG. 6). Since a stress applied to the nut cover 90 during the tightening of the bolt B1 can be dispersed in this way, the damage of the nut cover 90 during the tightening of the bolt B1 can be suitably suppressed.

Further, in the accommodating portion 60B, the lower surface of the nut 80 is supported by the connector housing 50 constituting the accommodating portion 60B and the upper surface of the nut 80 is supported by the lower surface of the terminal connecting portion 42 constituting the accommodating portion 60B. Thus, even if an excessive load is applied downward of the nut 80 such as during the tightening of the bolt B1, that load can be received by the connector housing 50. Therefore, the aforementioned excessive load can be received by the connector housing 50 higher in rigidity than the nut cover 90. As a result, the damage of the nut cover 90 and the connector housing 50 due to the excessive load can be suppressed.

Subsequently, the mating terminal 100 is overlapped on the upper surface of the terminal connecting portion 42 of the connection terminal 40A. Similarly to the connection of the connection terminal 40B and the mating terminal 100, the terminal connecting portion 42 of the connection terminal 40A and the mating terminal 100 are connected by tightening the bolt B1 into the nut 80. At this time, the mating terminal 100 can be connected to the terminal connecting portion 42 of the connection terminal 40A at least from two directions as in the case of the connection terminal 40B.

Next, functions and effects of this embodiment are described.

(1) The plurality of terminal connecting portions 42 are provided apart from each other in the arrangement direction of the connection terminals 40A, 40B and provided at the positions not overlapping each other in the plan view from the arrangement direction. Thus, the terminal connecting portion 42 of the connection terminal 40A and the terminal connecting portion 42 of the connection terminal 40B are not adjacently arranged in the arrangement direction and the front-rear direction X and lateral direction Y orthogonal to the arrangement direction. The mating terminal 100 can be connected to the terminal connecting portion 42 from two directions including the front-rear direction X and lateral direction Y except the arrangement direction, which is a direction parallel to the tightening direction C1 of the bolt B1, out of the three directions including the arrangement direction, front-rear direction X and lateral direction Y. In this way, assembling directions (connecting directions) of the mating terminal 100 to the terminal connecting portion 42 can be increased as compared to the case where the plurality of terminal connecting portions 42 are provided at positions overlapping each other in the plan view from the arrangement direction, and a degree of freedom of the assembling directions can be improved. As a result, the assemblability of the mating terminal 100 and the terminal connecting portion 42 can be improved.

(2) In other words, the mating terminal 100 can be pulled out from the terminal connecting portion 42 of the connection terminal 40A, 40B at least in two directions including the front-rear direction X and lateral direction Y. Thus, a degree of freedom of pull-out directions of the mating terminal 100 can be improved.

(3) The nut 80 is inserted into the accommodating portion 60A, 60B along the inserting direction D1, and the nut cover 90 is inserted into the accommodating portion 60A, 60B along the inserting direction D1. In this way, the inserting direction of the nut 80 into the accommodating portion 60A, 60B and that of the nut cover 90 into the accommodating portion 60A, 60B can be set in the same direction. That is, the nut 80 and the nut cover 90 can be inserted into the accommodating portion 60A, 60B along the same inserting direction D1. Thus, assembling man-hours of the connector 30 can be reduced as compared to the case where the inserting directions of the nut 80 and the nut cover 90 into the accommodating portion 60A, 60B are mutually different.

(4) The three side surfaces, out of the four side surfaces of each nut 80, are supported by the connector housing 50 and the remaining one side surface is supported by the nut cover 90. Thus, a tightening force of the bolt B1, i.e. a rotational force of the nut 80 about the tightening direction C1 of the bolt B1, can be received by the connector housing 50 and the nut cover 90 during the tightening operation of the bolt B1. A position shift of the nut 80 during the tightening operation of the bolt B1 can be suppressed by these connector housing 50 and nut cover 90.

(5) In the tightening operation of the bolt B1, there is a possibility that the tool such as a wrench is brought into contact with a head part of the bolt B to give an impact. In this case, an impact force is applied also to the nut 80 from the tip of the shaft part of the bolt B1 and also to a member supporting the lower surface of the nut 80. At this time, if the lower surface of the nut 80 is supported by the nut cover low in rigidity, the nut cover may be damaged by the impact force. Then, the nut 80 cannot be supported by the nut cover and the nut 80 is shifted in position, thereby causing a problem that the bolt B1 cannot be smoothly tightened.

In contrast, in this embodiment, the nut 80 and the nut cover 90 are accommodated into the accommodating portion 60A, 60B along the inserting direction D1, which is a direction intersecting the tightening direction C1 of the bolt B1. Further, the lower surface of the nut 80 is supported by the connector housing 50 constituting the inner surface of the accommodating portion 60A, 60B. In this way, the lower surface of the nut 80 can be supported by the connector housing 50 higher in rigidity than the nut cover 90. Thus, even if the aforementioned impact force is applied to the nut 80, that impact force can be received by the connector housing 50 high in rigidity. Therefore, the damage of components of the connector 30 by the impact force can be suitably suppressed.

(6) The plurality of nut covers 90 are formed to have the same shape and size. In this way, the components can be used in common.

(7) The body portion 91 of the nut cover 90 is provided with the wide portion 93. In this way, an operational force can be applied over a larger area when the nut cover 90 is inserted into the connector housing 50. Thus, the assemblability of the nut cover 90 with the connector housing 50 can be improved.

Other Embodiments

The above embodiment can be modified and carried out as follows. The above embodiment and the following modifications can be carried out in combination without technically contradicting each other.

Although the plurality of nut covers 90 are formed to have the same shape and size in the above embodiment, there is no limitation to this. For example, the plurality of nut covers 90 may be formed to have mutually different sizes. For example, the plurality of nut covers 90 may be formed to have mutually different shapes.

Although the plurality of nut covers 90 are individually inserted into the plurality of accommodating portions 60A, 60B in the above embodiment, there is no limitation to this. For example, one nut cover may be inserted into the plurality of accommodating portions 60A, 60B.

The shape of the nut cover 90 in the above embodiment is not particularly limited. For example, the plurality of ribs 94 may be omitted. For example, the wide portion 93 of the body portion 91 may be omitted. For example, projecting pieces may be provided which project along the inserting direction D1 from the body portion 91 and are inserted between the side surfaces of the nut 80 and the inner surface of the nut accommodating portion 61. For example, the nut cover 90 may be formed into a box shape.

Although the inserting direction of the nut 80 into the accommodating portion 60A, 60B and the inserting direction of the nut cover 90 into the accommodating portion 60A, 60B are set in the same direction in the above embodiment, there is no limitation to this. For example, the inserting directions of the nut 80 and the nut cover 90 into the accommodating portion 60A, 60B may be set in mutually different directions.

Although the connector housing 50 and the nut covers 90 are configured as separate members in the above embodiment, there is no limitation to this. For example, the connector housing 50 and the nut covers 90 may be integrally formed. In this case, the nut covers 90 are, for example, integrally formed to the connector housing 50 via hinges or the like.

The nut covers 90 of the above embodiment may be omitted.

The shape of the nut 80 in the above embodiment is not particularly limited. For example, the planar shape of the nut 80 when viewed from the penetration direction of the through hole 84 may be a triangular shape or a polygonal shape having five or more sides.

Although the tightening direction C1 of the bolt B1 is set to coincide with the arrangement direction of the plurality of connection terminals 40A, 40B in the above embodiment, there is no limitation to this. For example, the tightening direction C1 of the bolt B1 may be set to coincide with a direction intersecting the arrangement direction of the plurality of connection terminals 40A, 40B.

Although the arrangement direction of the plurality of connection terminals 40A, 40B is set to coincide with the plate thickness direction of each terminal connecting portion 42 in the above embodiment, there is no limitation to this. For example, the arrangement direction of the plurality of connection terminals 40A, 40B may be set to coincide with the width direction of each terminal connecting portion 42.

Although the plurality of terminal connecting portions 42 are provided at the positions not overlapping each other in the plan view from the arrangement direction of the connection terminals 40A, 40B by shifting the terminal connecting portions 42 from each other in the length diction of the connection terminals 40A, 40B in the above embodiment, there is no limitation to this. For example, the plurality of terminal connecting portions 42 may be provided at positions not overlapping each other in the plan view from the arrangement direction by shifting the terminal connecting portions 42 from each other in a direction orthogonal to both the length diction and arrangement direction of the connection terminals 40A, 40B. For example, the plurality of terminal connecting portions 42 may be provided at positions not overlapping each other in the plan view from the arrangement direction by shifting the terminal connecting portions 42 from each other in the width diction of the terminal connecting portions 42.

The shape of the connection terminal 40A, 40B in the above embodiment is not particularly limited. Although the terminal connecting portion 40A, 40B includes the male terminal portion 41 in the above embodiment, there is no limitation to this. For example, the connection terminal 40A, 40B may include a female terminal portion. In this case, for example, the wire-side connector 22 includes male terminal portions.

The number of the accommodating portions 60A, 60B in the connector 30 of the above embodiment is not particularly limited. The number of the accommodating portions 60A, 60B may be three or more.

The number of the connection terminals 40A, 40B to be mounted into the connector housing 50 of the above embodiment is not particularly limited. The number of the connection terminals 40A, 40B may be three or more.

An arrangement relationship of the inverter 11 and the high voltage battery 12 in the vehicle is not limited to the one in the above embodiment, but may be appropriately changed according to the configuration of the vehicle.

Although the inverter 11 and the high voltage battery 12 are adopted as electrical devices to be connected by the electrically conductive path 10 in the above embodiment, there is no limitation to this. For example, the electrically conductive path 10 may be adopted as a wire for connecting the inverter 11 and the wheel drive motor. That is, the electrically conductive path 10 is applicable to anything for electrically connecting electrical devices installed in the vehicle.

The connector housing 50 of the shown example may be referred to as an elongated connector housing. The fixing portion 53 of the connector housing 50 of the shown example may be referred to as a flange-like fixing portion, a fixing flange or a base of the connector housing 50. The receptacle 51 of the connector housing 50 of the shown example may be referred to as the rear end of the connector housing 50. In the example of FIG. 3, the accommodating portions 60A, 60B may be referred to as a stepped front end part of the connector housing 50. The accommodating portion 60A may be provided in the uppermost stage or first stage of the stepped front end part of the connector housing 50, and the accommodating portion 60B may be provided in the lowermost stage or second stage of the stepped front end part of the connector housing 50. The accommodating portion 60A or the contact surface of the terminal connecting portion 42 of the connection terminal 40A may be provided at a first length direction position away from the fixing portion 53 of the connector housing 50 by a first distance in the length direction of the connector housing 50. The accommodating portion 60B or the contact surface of the terminal connecting portion 42 of the connection terminal 40B may be provided at a second length direction position away from the fixing portion 53 of the connector housing 50 by a second distance in the length direction of the connector housing 50. The nut accommodating portion 61 of the shown example may be referred to as a linear nut accommodation slot for receiving the nut 80 from the length direction of the connector housing 50. The nut 80 of the shown example may be referred to as a rectangular nut.

The present disclosure includes combinations of the following elements.

[Supplementary Note 1]

A connector 30 according to several aspects of the present disclosure is provided with:

- a connector housing 50 including a plurality of accommodating portions 60, 60B;
- a plurality of connection terminals 40A, 40B held in the connector housing 50; and
- a plurality of nuts 80 respectively accommodated in the plurality of accommodating portions 60A, 60B so that a plurality of bolts B1 are respectively threadably engageable with the plurality of nuts 80 from the same bolt tightening direction C1;
- each of the plurality of connection terminals 40A, 40B including a terminal connecting portion 42 to be mechanically fastened to and electrically connected to a mating terminal 100 by the bolt B1 threadably engaged with the corresponding one of the plurality of nuts 80,
- the connector housing 50 including a stepped front end part having a plurality of stages,
- the plurality of accommodating portions 60A, 60B being respectively provided in the plurality of stages of the stepped front end part of the connector housing 50, and
- the terminal connecting portions 42 of the plurality of connection terminals 40A, 40B being provided apart from each other along the bolt tightening direction C1 and provided at positions not overlapping each other in a plan view from the bolt tightening direction C1.

[Supplementary Note 2]

As shown in FIGS. 4 and 5, in a certain aspect of the present disclosure, the connector housing 50 may be an elongated connector housing and include a flange-like fixing portion 53 for fixing the connector 30 to a case 15 of an electrical device, the first nut 80 corresponding to a contact surface of the terminal connecting portion 42 of the first connection terminal 40A, which is one of the plurality of connection terminals 40A, 40B, and the first connection terminal 40A may be provided at a first length direction position away from the flange-like fixing portion 53 by a first distance in a length direction (X) of the connector housing 50, and the second nut 80 corresponding to a contact surface of the terminal connecting portion 42 of the second connection terminal 40B, which is another one of the plurality of connection terminals 40A, 40B, and the second connection terminal 40B may be provided at a second length direction position away from the flange-like fixing portion 53 by a second distance in the length direction (X) of the connector housing 50.

[Supplementary Note 3]

As shown in FIG. 4, in a certain aspect of the present disclosure, the plurality of connection terminals 40A, 40B may be stacked in a height direction (Z) of the connector housing 50 with electrical insulation therebetween maintained,

- the terminal connecting portion 42 of the first connection terminal 40A, which is one of the plurality of connection terminals 40A, 40B, may be provided at a first height position in the height direction (Z) of the connector housing 50,
- the first nut 80 corresponding to the terminal connecting portion 42 of the first connection terminal 40A may be provided at a second height position right below the first height position,
- the terminal connecting portion 42 of the second connection terminal 40B, which is another one of the plurality of connection terminals 40A, 40B, may be provided at a third height position below the second height position in the height direction (Z) of the connector housing 50, and
- the second nut 80 corresponding to the terminal connecting portion 42 of the second connection terminal 40B may be provided at a fourth height position right below the third height position.

[Supplementary Note 4]

As shown in FIG. 3, in a certain aspect of the present disclosure, the connector housing 50 may include a plurality of linear nut accommodation slots (61) respectively provided at a plurality of height positions in the height direction (Z) of the connector housing 50 for respectively receiving the plurality of nuts 80 from the length direction (X) of the connector housing 50.

The embodiment disclosed this time should be considered illustrative in all aspects, rather than restrictive. The scope of the present invention is represented not by the above meaning, but by claims and is intended to include all changes in the scope of claims and in the meaning and scope of equivalents.

LIST OF REFERENCE NUMERALS

10 . . . electrically conductive path
11 . . . inverter
12 . . . high voltage battery
15 . . . case
16 . . . case body
17 . . . mounting portion
17X . . . mounting hole
18 . . . fixing portion
18X . . . bolt fixing hole
20 . . . wiring harness
21 . . . wire
22 . . . wire-side connector
23 . . . protective tube
30 . . . connector
40A, 40B . . . connection terminal
41 . . . male terminal portion
42 . . . terminal connecting portion
43 . . . coupling portion
44 . . . through hole
50 . . . connector housing
51 . . . receptacle
51X . . . accommodation groove
52 . . . inserting portion
53 . . . fixing portion
53X . . . bolt insertion hole
54 . . . collar
55 . . . tube portion
55X . . . accommodation groove
56A, 56B . . . terminal holding portion
57A, 57B . . . holding hole
58 . . . partition wall
60A, 60B . . . accommodating portion
61 . . . nut accommodating portion
62 . . . nut cover accommodating portion
63 . . . base portion
63X . . . recess
63Y . . . recess
64 . . . side wall portion
64A, 64B . . . side surface
65 . . . back wall portion
66 . . . upper wall portion
66X . . . accommodation recess
67 . . . locking portion
67A . . . guide surface
71, 72 . . . rubber ring
80 . . . nut
84 . . . through hole
90 . . . nut cover
91 . . . body portion
91A . . . end surface
92 . . . locking piece
93 . . . wide portion
94 . . . rib
95 . . . locking portion
100 . . . mating terminal
101 . . . through hole
B1 . . . bolt
B2 . . . fixing bolt
C1 . . . tightening direction
D1 . . . inserting direction

What is claimed is:

1. A connector, comprising:

a connector housing including a plurality of accommodating portions;

a plurality of connection terminals held in the connector housing;

a plurality of nuts respectively inserted into in the plurality of accommodating portions along an inserting direction to be accommodated in the accommodating portions; and a plurality of nut covers inserted into in the plurality of accommodating portions along the inserting direction, accommodated in the accommodating portions to cover the nuts accommodated in the accommodating portions, and configured to restrict movements of the nuts in a direction opposite to the inserting direction, respectively, wherein each of the plurality of connection terminals includes a terminal connecting portion to be connected to a mating terminal by tightening a bolt into the nut in a tightening direction intersecting the inserting direction, a plurality of the terminal connecting portions are provided apart from each other in an arrangement direction of the plurality of connection terminals and provided at positions not overlapping each other in a plan view from the arrangement direction, each of the nut covers includes a body portion having an end surface facing the nuts and a plurality of ribs formed to project in the inserting direction from the end surface of the body portion, and the plurality of ribs are in contact with each of the nuts.

2. The connector of claim 1, wherein:

each of the plurality of connection terminals that overlap each other in the arrangement direction of the plurality of connection terminals includes the terminal connecting portion, and the plurality of the terminal connecting portions are provided only at positions not overlapping each other in the arrangement direction and in a direction orthogonal to the arrangement direction.

3. The connector of claim 1, wherein:

each of the nut covers is a component separate from the connector housing, each of the nuts is formed into a rectangular prism having an upper surface, a lower surface and four side surfaces provided between the upper and lower surfaces, each of the nuts includes a through hole penetrating between the upper and lower surfaces, and three side surfaces, out of the four side surfaces, are supported by the connector housing constituting an inner surface of the accommodating portion and the remaining one side surface is supported by the nut cover.

4. The connector of claim 3, wherein one of the upper and lower surfaces of each of the nuts is supported by the connector housing constituting the inner surface of the accommodating portion, and the other of the upper and lower surfaces of each of the nuts is supported by the terminal connecting portion.

5. The connector of claim 3, wherein:

the plurality of ribs are in contact with the remaining one side surface of the each of the nuts.

6. The connector of claim 1, wherein:

each of the nut covers further includes a locking piece formed to project in the inserting direction from the end surface of the body portion, and the accommodating portion includes a locking portion to be locked to the locking piece.

7. The connector of claim 1, wherein:

the plurality of nut covers are formed to have the same shape and size.

8. The connector of claim 1, wherein the arrangement direction is a direction parallel to a tightening direction of the bolt into the nut.

* * * * *